United States Patent
Hara et al.

[11] Patent Number: 5,938,299
[45] Date of Patent: Aug. 17, 1999

[54] BRAKING FORCE DISTRIBUTION CONTROLLING APPARATUS

[75] Inventors: Masahiro Hara; Tadashi Chiba, both of Susono, Japan

[73] Assignee: Toyota Jidosha Kabushiki Kaisha, Toyota, Japan

[21] Appl. No.: 08/922,673

[22] Filed: Sep. 3, 1997

[30] Foreign Application Priority Data

Sep. 9, 1996 [JP] Japan .................................. 8-237850

[51] Int. Cl.[6] .................................................. B60T 13/00
[52] U.S. Cl. ........................................ 303/186; 303/113.5
[58] Field of Search ..................... 303/186, 188, 303/189, 113.5, 3, 15, 20, DIG. 7, 9.62

[56] References Cited

U.S. PATENT DOCUMENTS 5,150,951  9/1992  Leiber et al. ..................... 303/113.4 X
5,558,415  9/1996  Buschmann et al. ................... 303/186
5,632,535  5/1997  Luckevich et al. .............. 303/113.5 X
5,676,434  10/1997 Ichikawa et al. ...................... 303/186

FOREIGN PATENT DOCUMENTS 6-144178  5/1994  Japan .
6/144176  5/1994  Japan .

Primary Examiner—Lee W. Young
Attorney, Agent, or Firm—Pillsbury Madison & Sutro LLP

[57] ABSTRACT

In a braking force distribution controlling apparatus mounted on a car and arranged to perform such a control as to make a rear-wheel braking force smaller than a front-wheel braking force when predetermined initiation conditions are met, one of the initiation condition is to satisfy either one of such a first condition that a body deceleration is not less than a first predetermined deceleration K1 and that a rear-wheel slip value is a first predetermined value or more greater than a front-wheel slip value and such a second condition that the body deceleration is not less than a second predetermined deceleration K2 which is a value greater than the aforementioned first predetermined deceleration K1.

4 Claims, 3 Drawing Sheets

BRAKING FORCE DISTRIBUTION CONTROLLING APPARATUS

BACKGROUND OF THE INVENTION

1. Field of the Invention

The present invention relates to a braking force distribution controlling apparatus for controlling the braking force of the rear wheels of car in a predetermined relation with that of the front wheels of car during braking of car.

2. Related Background Art

When the braking operation is effected on a running car, axle weights on the front wheels and on the rear wheels differ from each other because of migration of load. Therefore, braking forces of wheels specified by slip rates and axle weights are different between the front wheels and the rear wheels. On the other hand, in order to maximize the utilization of the braking forces for stopping the car, the four wheels should be locked simultaneously. FIG. 1 is an ideal braking force distribution characteristic diagram to show distributions of front-wheel and rear-wheel braking forces when the four wheels are locked simultaneously, wherein the abscissa indicates the braking force of the front wheels while the ordinate indicates the braking force of the rear wheels. The ideal braking force distributions are different between when the car is empty and when the car is loaded. In the same figure, characteristic curve A shows the ideal braking force distribution in the empty car state and characteristic curve B the ideal braking force distribution in the normal loaded car state.

The braking force distribution controlling apparatus is intended to perform such a brake control as to make an actual braking force distribution closer to the ideal braking force distribution and performs such a control as to restrict the braking force of the rear wheels when predetermined conditions are met, in such a way that the braking force of the rear wheels is kept from exceeding the braking force of the rear wheels in the ideal braking force distribution in the loaded car state. The reason why the braking force of the rear wheels is controlled so as to be always smaller than the ideal braking force distribution is that rear-wheel braking forces higher than the ideal braking force distribution will degrade driving stability.

According to Japanese Laid-open Patent Applications No. Hei 6-144176 and No. Hei 6-144178, etc., the braking force distribution control is started to restrict the braking force of the rear wheels when an estimated body deceleration becomes a predetermined deceleration or more and when a velocity difference between a wheel velocity of front wheel and a wheel velocity of rear wheel becomes a predetermined value or more. This shows the characteristic like broken line C as shown in FIG. 1, for example.

In the case of the conventional braking force distribution controlling apparatus as described above, however, when so-called irregular size tires other than standard tires are mounted, errors are produced in detected values of wheel velocity, so that the velocity difference is not obtained accurately between the wheel velocity of front wheel and the wheel velocity of rear wheel. Especially, when the irregular size tires are mounted as only either the front wheels or the rear wheels, inaccuracy of the velocity difference is enhanced furthermore.

Owing to it, there are such cases that the braking force distribution control is not started even though it is necessary while satisfying the condition that the actual body deceleration and the actual front-rear wheel velocity difference each are equal to or greater than the respective predetermined values.

SUMMARY OF THE INVENTION

Thus, the braking force distribution controlling apparatus of the present invention is so arranged that one of initiation conditions is to satisfy either one of such a first condition that a body deceleration is not less than a first predetermined deceleration K1 and that a rear-wheel slip value is greater than a front-wheel slip value by at least a first predetermined value and such a second condition that the body deceleration is not less than a second predetermined deceleration K2, which is a value greater than the aforementioned first predetermined deceleration K1.

By this, the braking force distribution control of the front and rear wheels is initiated when the body deceleration becomes the second predetermined deceleration K2 or more, irrespective of the difference between the slip value of front wheel and the slip value of rear wheel. This makes such events hard to occur that the braking force distribution control is not activated even though the actual difference between the front and rear slip values is greater than the value necessitating the braking force distribution control, because of inaccurate detection of the difference between the front and rear slip values as in the case of the irregular size tires being mounted.

As the second invention, the second condition in the above first invention, i.e., the condition that the body deceleration is not less than the second predetermined deceleration K2 being the value greater than the first predetermined deceleration K1, may be replaced by such a condition that the body deceleration is not less than the second predetermined deceleration K2 being the value greater than the first predetermined deceleration K1 and that the rear-wheel slip value is greater than the front-wheel slip value by at least a second predetermined value which is smaller than the first predetermined value.

On road surfaces causing a great drop of velocities of the four wheels during braking like low-$\mu$ roads, the all velocities of the four wheels take values apart from the actual body velocity, which makes unreliable the body deceleration calculated based on the wheel velocities, and as a result, the body deceleration calculated sometimes demonstrates a large value, though the actual body deceleration is small. Under such a condition, the braking force distribution control might be started even though the front-wheel slip value is greater than the rear-wheel slip value, accordingly. In this case the condition that "the rear-wheel slip value is greater than the front-wheel slip value at least the second predetermined value which is smaller than the first predetermined value" is added to the second condition as in the second invention, whereby the braking force distribution control is prevented from being initiated erroneously when the front-wheel slip value is greater than the rear-wheel slip value.

The difference between the front and rear slip values can be obtained readily by subtracting the wheel velocity of rear wheel from the wheel velocity of front wheel.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 2:
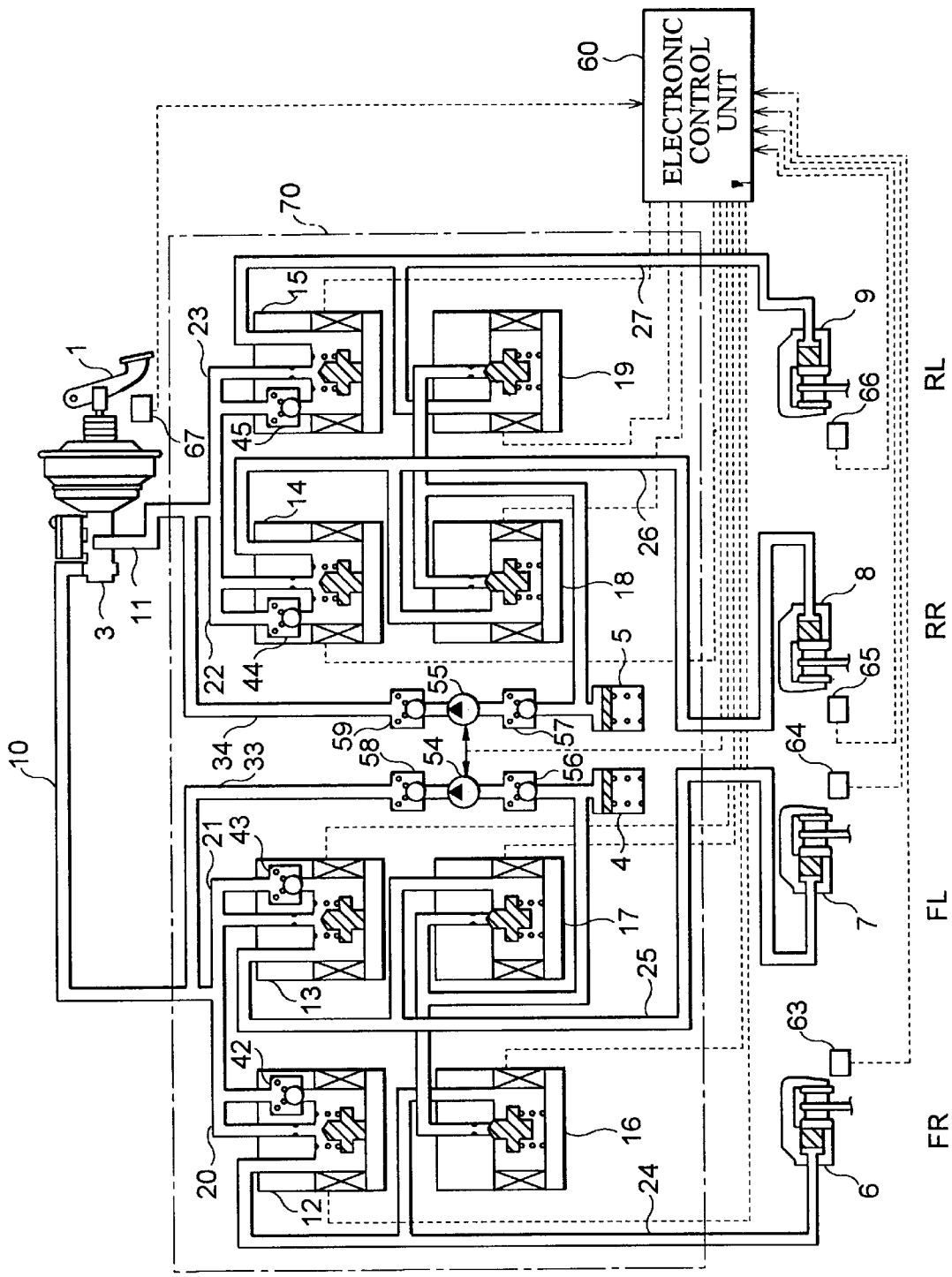
FIG. 2 is a block diagram to show the overall configuration of the first and second embodiments of the present invention.

FIG. 2 is a structural diagram to show an embodiment of the braking force distribution controlling apparatus according to the present invention, which has an oil hydraulic circuit 70 for transmitting a stepping-on force on brake pedal 1 to each wheel cylinder 6–9 of the four wheels, and electronic control unit 60 for controlling on/off of plural solenoid valves provided in the oil hydraulic circuit 70 to effect the braking force distribution adjustment of the front and rear wheels. Since this oil hydraulic circuit 70 is so constructed as to be also ready for an anti-lock brake system (ABS) for suppressing wheel slip during braking by increasing or decreasing brake oil pressure, it also includes elements unnecessary for the braking force distribution control.

First described is the basic configuration and action of the oil hydraulic circuit 70. An oil pressure path is composed of four systems including right front wheel system FR for controlling the oil pressure of right front wheel cylinder 6, left front wheel system FL for controlling the oil pressure of left front wheel cylinder 7, right rear wheel system RR for controlling the oil pressure of right rear wheel cylinder 8, and left rear wheel system RL for controlling the oil pressure of left rear wheel cylinder 9. Each system is equipped with a set of one of retaining solenoid valves 12, 13, 14, and 15 and one of pressure-reducing solenoid valves 16, 17, 18, and 19, and one mode can be selected out of four modes, including a normal mode, a pressure-reducing mode, a retaining mode, and a pressure-increasing mode, for every system by combinations of open/close states of the retaining solenoid valve and pressure-reducing solenoid valve, and on/off of pump 54, 55. The braking force distribution controlling apparatus of the present embodiment performs such a control as to select the normal mode for all of the four systems when not operating, but as to select the retaining mode for only the right and left rear wheel systems RR and RL when operating.

Since each system is operated in the same way, the operation of the right rear wheel system RR will be described as being typical of the four systems. The retaining solenoid valve 14 is a normally open valve and the valve is closed when a solenoid thereof is turned on. The pressure-reducing solenoid valve 18 is a normally close valve on the other hand and the valve is opened when a solenoid thereof is turned on.

In the normal mode the retaining solenoid valve 14 and the pressure-reducing solenoid valve 18 both are off, so that the retaining solenoid valve 14 is in the open state while the pressure-reducing solenoid valve 18 is in the close state. When the brake pedal 1 is stepped on in this state, the oil pressure of master cylinder 3 increases to feed the brake fluid through pipe 11, pipe 22, retaining solenoid valve 14, and pipe 26 to the wheel cylinder 8. This causes the wheel cylinder 8 to pinch a rotor, thereby braking the wheel. When the brake pedal 1 is released, the brake fluid in the wheel cylinder 8 returns through the pipe 26, retaining solenoid valve 14, pipe 22, and pipe 11 to the master cylinder 3. In the returning operation two paths, including a path passing a main valve and a path passing a check valve 44, are formed in the retaining solenoid valve 14, thereby quickly effecting release of brake.

In the pressure-reducing mode the retaining solenoid valve 14 and the pressure-reducing solenoid valve 18 both are on, so that the retaining solenoid valve 14 is in the close state while the pressure-reducing solenoid valve 18 is in the open state. Since the retaining solenoid valve 14 is closed, even if the brake pedal 1 is stepped on to increase the oil pressure of master cylinder 3, the brake fluid from the master cylinder 3 will be intercepted here. On the other hand, the brake fluid of the wheel cylinder 8 flows from the pressure-reducing solenoid valve 18 to reservoir 5, thereby decreasing the oil pressure of the wheel cylinder 8. The brake fluid reserved in the reservoir 5 is returned to the master cylinder 3 by pump 55. This mode is selected when the ABS is activated, but it is not selected in the braking force distribution control of the present embodiment.

In the retaining mode the retaining solenoid valve 14 is on and the pressure-reducing solenoid valve 18 is off, so that the retaining solenoid valve 14 and the pressure-reducing solenoid valve 18 both are closed. Therefore, since the both of the path to the master cylinder 3 and the path to the reservoir 5 are intercepted, the oil pressure of the wheel cylinder 8 is retained at the value at the time of changeover to the retaining mode. To carry out the braking force distribution control in the present embodiment means to keep the right and left rear wheel systems RR and RL in this retaining mode and the right and left front wheel systems FR and FL in the normal mode.

In the pressure-increasing mode the retaining solenoid valve 14 and the pressure-reducing solenoid valve 18 both are off, so that the retaining solenoid valve 14 is open while the pressure-reducing solenoid valve 18 is close. This is the same as in the normal mode, but in the pressure-increasing mode the pump 55 is further turned on to feed the brake fluid of reservoir 5 to the master cylinder 3. This mode is also selected in the ABS as the pressure-reducing mode was, but it is not selected in the braking force distribution control of the present embodiment.

The oil hydraulic circuit 70 of the present embodiment is not provided with any such valve as a proportioning valve (P valve) being a mechanical valve for effecting the front and rear braking force distribution or a load sensitive P valve for changing a restricting point of the rear-wheel braking force in accordance with a carrying load of car, so that during control in the normal mode the braking forces are determined according to a basic distribution determined by the brake apparatus.

Figure 3:
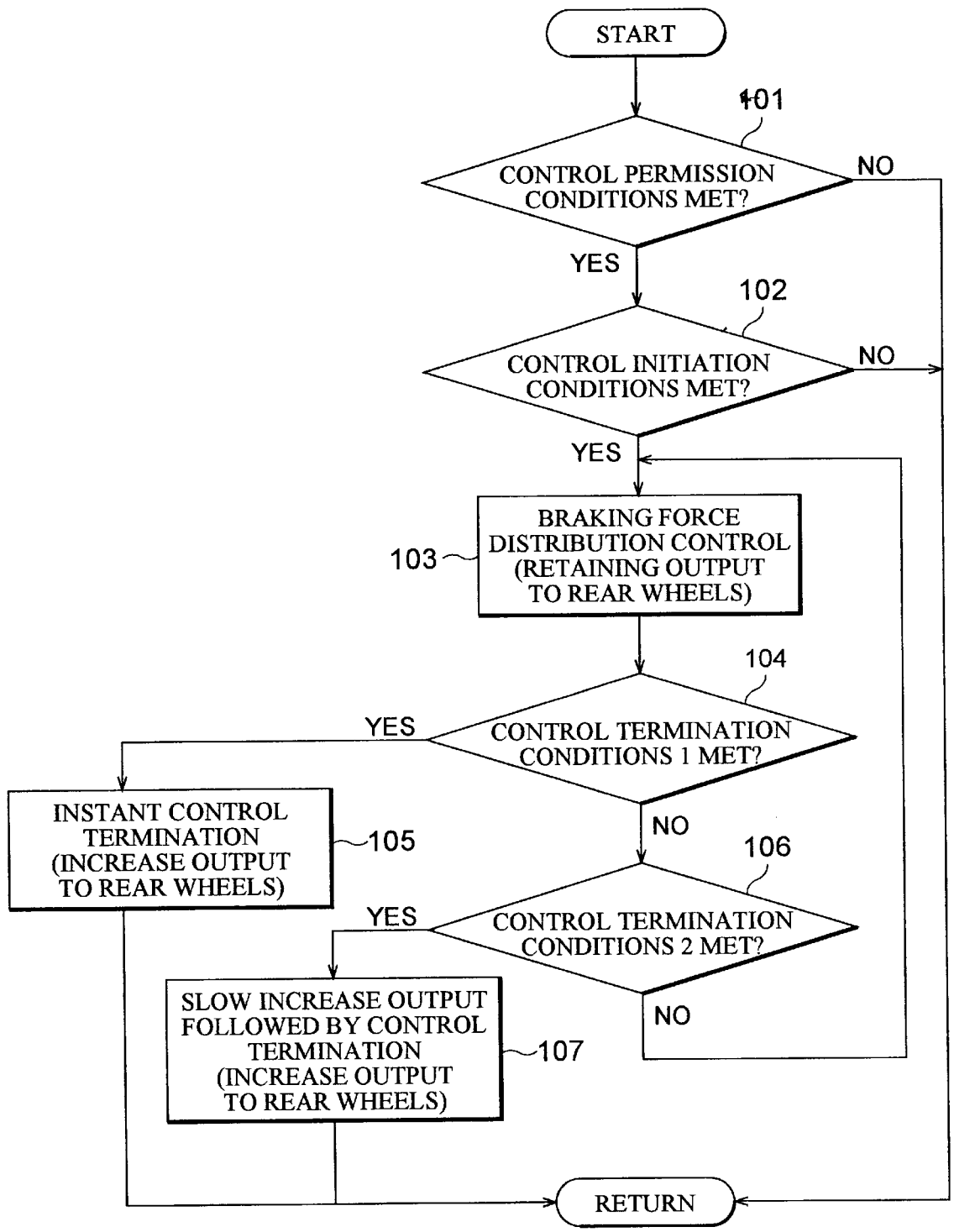
FIG. 3 is a flowchart to show the operation flow of the electronic control unit of FIG. 2.

The electronic control unit 60 has a microcomputer comprised of CPU, ROM, RAM, I/O interface, and timer mutually connected through bus, though not illustrated, and executes the braking force distribution control operation according to the flowchart shown in FIG. 3. Specifically, it receives signals from wheel velocity sensors 63 to 66 for outputting a pulse signal of a frequency according to the wheel velocity, from stop switch 67 for maintaining an off state when the brake pedal 1 is free, but maintaining an on state when the brake pedal 1 is stepped on, and so on, it processes them in accordance with programs stored in the ROM, and it performs on/off control of the solenoid valves in the oil hydraulic circuit 70.

Next, the operation of the braking force distribution controlling apparatus of the present embodiment will be described with reference to the flowchart of FIG. 3. This flowchart shows the start to the end of the front and rear wheel braking force distribution control, and before the start and after the end of this control the brake operation in the normal mode is normally carried out in the all four wheels.

First, it is determined whether control permission conditions are met (step 101). The control permission conditions are fundamental conditions for carrying out the braking force distribution control, one of which is such a condition that the basic elements necessary for the braking control including the braking force distribution control and the control of ABS have no such anomaly as disconnection of the wheel velocity sensors 63 to 66, disconnection of each solenoid used in the oil hydraulic circuit 70, a failure of a motor relay for moving the pump 54, 55. A major premise is that the control is not permitted when there is an anomaly in the basic elements for the braking control.

In addition to the anomaly in the basic elements, one of the permission conditions is that the status is one not necessitating activation of the ABS control. The braking force distribution control and the ABS control, both controlling the oil hydraulic circuit, can be carried out only in an alternative way, and a priority of the braking force distribution control is lower than that of the ABS control.

When these control permission conditions are satisfied, the flow advances to step 102 to determine whether control initiation conditions are met. The control initiation conditions are conditions for estimating such circumstances that in the normal braking operation not performing the braking force distribution control, the rear braking force exceeds the front braking force over the characteristic A indicating the ideal braking force distribution in the empty car state or the characteristic B indicating the ideal braking force distribution in the normal loaded car state in FIG. 1. The determination in the step 102 is made by whether either first or second principal condition described below is satisfied, on the basis of a plurality of auxiliary conditions being satisfied.

The first principal condition of control start is to satisfy such a condition that estimated body deceleration $DV_{SOF}$ is not less than a positive predetermined value K1 and that a difference between front and rear slip amounts is not less than a predetermined value S1. Namely, it is to satisfy the following.

Estimated body deceleration≧K1 (1)

Difference between front and rear slip amounts≧S1 (2)

Here, the difference between front and rear slip amounts is given as follows:

Difference between front and rear slip amounts=(rear-wheel slip amount)−(front-wheel slip amount) (3);

which is equal to a value obtained by subtracting the wheel velocity of rear wheel from the wheel velocity of front wheel (=(wheel velocity of front wheel)−(wheel velocity of rear wheel)). Circumstances to satisfy this first principal condition are produced during deceleration operation.

In the present embodiment the value of K1 is set to 0.4 G, where G is the acceleration of gravity. Further, S1 differs depending upon the estimated body velocity $V_{SOF}$ and is set as follows:

S1=0.01 $V_{SOF}$ when $V_{SOF}$≧50 km/h (4);

S1=0.5 km/h when 50 km/h >$V_{SOF}$≧6 km/h (5).

The difference between front and rear slip amounts is the difference between the wheel velocity of front wheel and the wheel velocity of rear wheel, as described above, which is obtained, for example, by carrying out a process for obtaining five consecutive wheel velocity differences of the front and rear wheels from wheel velocities obtained based on signals from the wheel velocity sensors 63 to 66 every 12 ms and for employing a mean value thereof.

The estimated body velocity is one estimated based on the wheel velocities and temporal changes thereof and a computational algorithm usually used in the ABS or the like is applied. Further, the estimated body deceleration $DV_{SOF}$ is calculated as a change of the estimated body velocity $V_{SOF}$ and is given by the following.

$$DV_{SOF(N)} = (V_{SOF(N-1)} - V_{SOF(N)})/\Delta t, \; \Delta t = 12 \text{ ms}$$

Subscript N indicates values at this time and (N−1) does one at the preceding calculation (12 ms before). Further, $V_{SOF}$ is given by the following equation.

$$V_{SOF(N)} = \text{MED}(V_{W0}, V_{SOF(N-1)} - \alpha_{DW} \times t, V_{SOF(N-1)} + \alpha_{UP} \times t)$$

where $V_{W0}$ is a maximum wheel velocity value out of the wheel velocities of the four wheels, where $\alpha_{DW}$ is a guard value of body deceleration, which is, for example, 1G, where αUP is a guard value of body acceleration, which is, for example, 2G, where MED (A, B, C) is the median out of A, B, C, where t=12 ms, and where "$V_{SOF(N-1)} - \alpha_{DW} \times t$" is a body velocity this time where the body velocity is assumed to change at $\alpha_{DW}$ (the guard value of body deceleration) from the preceding body velocity, which is a lower-limit guard of body velocity. "$V_{SOF(N-1)} + \alpha_{UP} \times t$" is a body velocity this time where the body velocity is assumed to change at $\alpha_{UP}$, (the guard value of body acceleration) from the preceding body velocity, which is an upper-limit guard of body velocity. Accordingly, $V_{SOF(N)}$ is guarded by the upper and lower limits against the maximum wheel velocity value out of the wheel velocities of the four wheels. It is also possible to simply employ the maximum wheel velocity value out of the wheel velocities of the four wheels, as the body velocity without the guards.

The second principal condition of control start is that the estimated body deceleration $DV_{SOF}$ is not less than a positive predetermined value K2 which is greater than K1 described above. Namely, it is to satisfy the following.

Estimated body deceleration≧K2 (6)

In the present embodiment K2 is set to 0.6 G (where G is the acceleration of gravity). This second principal condition is that when the estimated body deceleration exhibits a large value, initiation of the braking force distribution control is permitted irrespective of the magnitude of the difference between front and rear slip amounts. Initiation timing of the braking force distribution control should be determined essentially based on the difference between front and rear slip amounts during deceleration. However, when the irregular size tires are mounted as the wheels, the difference between front and rear slip amounts calculated based on outputs from the wheel velocity sensors does not represent the actual difference between front and rear slip amounts accurately in some cases. Therefore, determination by only the first principal condition would result in not starting the braking force distribution control in some cases though the circumstances to restrict the rear-wheel braking force have come. In such cases the braking force distribution control is also started when the estimated body deceleration shows such a large value as to satisfy Eq. (6). By this, the braking force distribution control relatively close to the ideal braking force distribution can be performed even in the case wherein the irregular size tires are mounted and the difference between front and rear slip amounts cannot be detected accurately.

An auxiliary condition of the control initiation conditions is that the estimated body velocity $V_{SOF}$ satisfies the following.

$$10 \text{ km/h} \leq V_{SOF} < 250 \text{ km/h} \quad (7)$$

This is for the following reason. Since the braking force distribution control is unnecessary at low body velocities and since an anomaly could possibly occur in the wheel velocity sensors with extremely high velocities, the braking force distribution control is inhibited in such cases.

When the control initiation conditions are met, the flow goes to the braking force distribution control process at step 103 to change over the oil hydraulic circuit of the right and left rear wheels from the normal mode to the retaining mode. Specifically, the retaining solenoid valves 14, 15 are changed into the on state while maintaining the pressure-reducing solenoid valves 18, 19 in the off state. This increases the pressure of the wheel cylinders 6 and 7 of the right and left front wheels with the braking operation of car driver, but the oil pressure of the wheel cylinders 8 and 9 of the right and left rear wheels is retained, thus decreasing a ratio of the braking force of the rear wheels to that of the front wheels.

For this braking force distribution control process 103, timing to terminate it is monitored by two determination steps 104 and 106 described next. There are two ways of termination: when a termination condition at determination step 104 is met, the flow goes to step 105 to immediately end the braking force distribution control; when a termination condition at determination step 106 is met, the pressure of the wheel cylinders 8 and 9 of the rear wheels is gradually increased and thereafter the control is ended.

The termination condition at determination step 104 includes five types of conditions described below.

(1) The condition that arises when the stop switch 67 is turned off, i.e., when the driver releases the brake pedal 1 to stop the braking operation.

(2) The condition that arises when the rear wheels go into the ABS control.

(3) The condition that arises when the braking force distribution control is carried out continuously for a predetermined time, for example, for 15 seconds.

(4) The condition that arises when the estimated body velocity $V_{SOF}$ becomes smaller than a predetermined value, for example, 6 km/h.

(5) The condition that arises when the estimated body deceleration $DV_{SOF}$ becomes smaller than a predetermined value, for example, 0.3 G (where G is the acceleration of gravity).

When either one of these conditions is satisfied, the flow proceeds to step 105 to immediately turn off the retaining solenoid valves 14 and 15 provided in the oil hydraulic circuit of the rear wheels, thereby effecting changeover from the retaining mode to the normal mode.

The termination condition at determination step 106 includes the condition that arises when the control initiation of ABS is inhibited, which is the condition that some anomaly occurs in the basic elements necessary for the braking control, such as disconnection of the wheel velocity sensors 63 to 66, disconnection of each solenoid used in the oil hydraulic circuit 70, and the failure of the motor relay for moving the pump 54, 55, the condition that arises when the ABS control is started for either of the right and left front wheels, and so on. In this case, the flow moves to the termination process 107 to perform the on/off switching control of the retaining solenoid valves 14, 15 for the rear wheels, for example, in accordance with the following table indicating a slowly increasing output pattern,

TABLE 1

|  | Retention time [ms] | Pressure increase period [ms] |
|---|---|---|
| 1st pulse | 15 | 15 |
| 2nd pulse | 40 | 15 |
| 3rd pulse | 15 | 15 |
| 4th pulse | 40 | 15 |
| 5th pulse | 15 | 15 |
| 6th pulse | 40 | 15 |
| 7th pulse | 15 | 15 |
| 8th pulse | 40 | 15 | thereby increasing the pressure of brake fluid of the rear wheels more slowly than in the termination based on the termination condition at step 104, and thereafter keeping the two retaining solenoid valves fixed in the off state, thereby ending the braking force distribution control.

After the end of the braking force distribution control, the flow returns to step 101 to repetitively carry out the determinations at steps 101 and 102 until the control permission conditions and the control initiation conditions are met. When the both conditions are met, the braking force distribution control is carried out again.

The estimated body deceleration is a calculation result of the change amount of estimated body velocity calculated every predetermined interval, for example, every 12 ms, as described previously, and the estimated body velocity is obtained based on the upper and lower-limit guards given to the maximum wheel velocity value out of the wheel velocities of the four wheels.

The first embodiment employed the following as one of the first principal condition;

$$\text{Difference between front and rear slip amounts} \geq S1 \quad (2)$$

but, instead thereof, the condition may be set using a slip rate which is one of slip values as the slip amounts are. The slip rate is a ratio of slip amount to estimated body velocity, and a one-side front-rear slip rate difference (SLIP) obtained by subtracting the slip rate of the front wheel from the slip rate of the rear wheel in the left-side wheels or in the right-side wheels, is expressed by Eq. (8) below.

$$\text{SLIP} = \sum_{n-4}^{n} (V_{WF} - V_{WR})/V_{SOF}/5 \quad (8)$$

This one-side front-rear slip rate difference is calculated for the right and left wheels and a mean value thereof is calculated as shown by next Eq. (9), thus obtaining a difference between front and rear slip rates.

$$\text{Difference between front and rear slip rates} = (\text{SLIPR} + \text{SLIPL})/2 \quad (9)$$

Here, $V_{WF}$ is the wheel velocity of front wheel, $V_{WR}$ the wheel velocity of rear wheel, $V_{SOF}$ the estimated body velocity, SLIPR the difference between slip rates of the right front and rear wheels, and SLIPL the difference between slip rates of the left front and rear wheels. Then it is also possible to contemplate such a modification that the following condition is employed as one of the first principal condition, instead of above Eq. (2).

$$\text{Difference between front and rear slip rates} \geq S2 \quad (10)$$

In this case, S2 is defined, for example, as follows:

$$S2=0.01 \text{ when } V_{SOF} \geq 50 \text{ km/h};$$

$$S2=0.5/V_{SOF} \text{ when } 50 \text{ km/h} > V_{SOF} \geq 6 \text{ km/h}.$$

When the slip rate, which is the result of division of the slip amount by the estimated body velocity, is used as a parameter of initiation condition in this way, influence of errors due to the irregular size tires is reduced, thereby achieving the effect of further enhancing the accuracy.

Further, instead of the difference between front and rear slip rates, a corrected front-rear slip rate difference indicated by next Eq. (11) may be used.

$$\text{Corrected front-rear slip rate difference} = (SLIPR + SLIPL)/2 - (SLIP0R + SLIP0L)/2 \quad (11)$$

Here, SLIP0R is a right-side front-rear wheel slip rate difference when the stop switch is changed from off to on (that is, when the brake is changed from the non-operating state to the operating state) and SLIP0L is a left-side front-rear wheel slip rate difference when the stop switch is changed from off to on (that is, when the brake is changed from the non-operating state to the operating state). By subtracting the front-rear slip rate difference in the predetermined state from the current front-rear slip rate difference in this way, offset components from real wheel velocity values, occurring in the case of the irregular size tires, can be canceled out. This can reduce the influence of errors due to the irregular size tires furthermore. However, the components that can be canceled out are additive or subtractive offset components, but proportional components cannot be canceled out. This correction is effective not only to the front-rear slip rate difference, but also to the front-rear slip amount difference. Namely, by subtracting the difference between front and rear slip values in the predetermined state from the current difference between front and rear slip values, the additive or subtractive influence occurring due to the irregular size tires can be eliminated, whereby the accuracy can be enhanced further.

Next, the second embodiment of the present invention will be described. In the first embodiment the control initiation conditions at step 102 in the flowchart of FIG. 3 are that the plural auxiliary conditions are satisfied and, in addition, that either one of the two principal conditions is satisfied. There was explained the example wherein among the two control initiation principal conditions, the second principal condition was that the estimated body deceleration $DV_{SOF}$ was not less than the predetermined value K2 greater than K1 of the first principal condition and wherein K2 was 0.6 G (where G is the acceleration of gravity). In the second embodiment another condition that the difference between front and rear slip amounts is a positive value, is added to the second principal condition. Namely, the second principal condition of control initiation is to satisfy:

$$\text{Estimated body deceleration} \geq K2 \quad (6);$$

and $$\text{Difference between front and rear slip amounts} > 0 \quad (12).$$

The all other points are the same as in the first embodiment, the overall configuration including the oil hydraulic circuit is as shown in FIG. 2, and the flowchart to show the operation of the electronic control unit 60 in FIG. 2 is as shown in FIG. 3. Therefore, redundant description of the overall configuration and flowchart is omitted herein.

In the first embodiment, when Eq. (6) is satisfied, the braking force distribution control is started irrespective of the value of the front-rear slip amount difference or the front-rear slip rate difference, taking account of the cases where the irregular size tires are mounted. However, in the case wherein the velocities of the four wheels drop greatly during braking, for example, during driving on a low-$\mu$ road, the estimated body deceleration might be calculated as a value greater than the actual deceleration in some cases, as described previously. Then there are such cases that Eq. (6) is satisfied to activate the braking force distribution control even though the front-rear slip amount difference or the front-rear slip rate difference is negative, i.e., even though the rear-wheel slip amount is smaller than the front-wheel slip amount. Therefore, added to the second principal condition of initiation condition is the condition that at least the difference between front and rear slip amounts is neither zero nor negative, that is, that the rear-wheel slip value is greater than the front-wheel slip value. Thanks to this, no delay occurs in initiation of the braking force distribution control even in the case wherein the irregular size tires are mounted, and in addition, unnecessary activation of the braking force distribution control can be prevented on roads exhibiting a great velocity drop of the four wheels, such as low-$\mu$ roads.

The present embodiment employed, as the second principal condition, the condition of Eq. (12) that the difference between front and rear slip amounts is positive, but the condition may be such that it is not less than a positive value S3 which is smaller than S1 of the first principal condition, because the necessary condition is to be capable of detecting that the rear-wheel slip value is greater than the front-wheel slip value.

It is also permissible to add another process for setting such arithmetic permission conditions of the front-rear slip amount difference or the front-rear slip rate difference that the various sensors are normal and that the estimated body velocity is not less than 6 km/h and that the stop switch is on and for making the front-rear slip amount difference or the front-rear slip rate difference equal to zero when the conditions are not met, to the flow anywhere before step 103. This arrangement fixes the front-rear slip amount difference or the front-rear slip rate difference at such a value as not to satisfy Eqs. (2), (10), (12), which can prevent a deceleration from occurring due to shift down of transmission, thereby preventing the condition equations of the braking force distribution control from being satisfied, in the case of the failure of the stop switch, in the case wherein a process for detecting the failure is added to the arithmetic permission conditions and the failure is not detected, and so on.

The first and second embodiments were so arranged that the oil pressure of the wheel cylinders of the right and left rear wheels was retained when the first and second conditions were satisfied, but the brake oil pressure may be arranged to increase slowly by on/off switching control of the retaining solenoid valves for the rear wheels.

Finally, another effect of the first and second embodiments of the present invention will be described.

Figure 1:
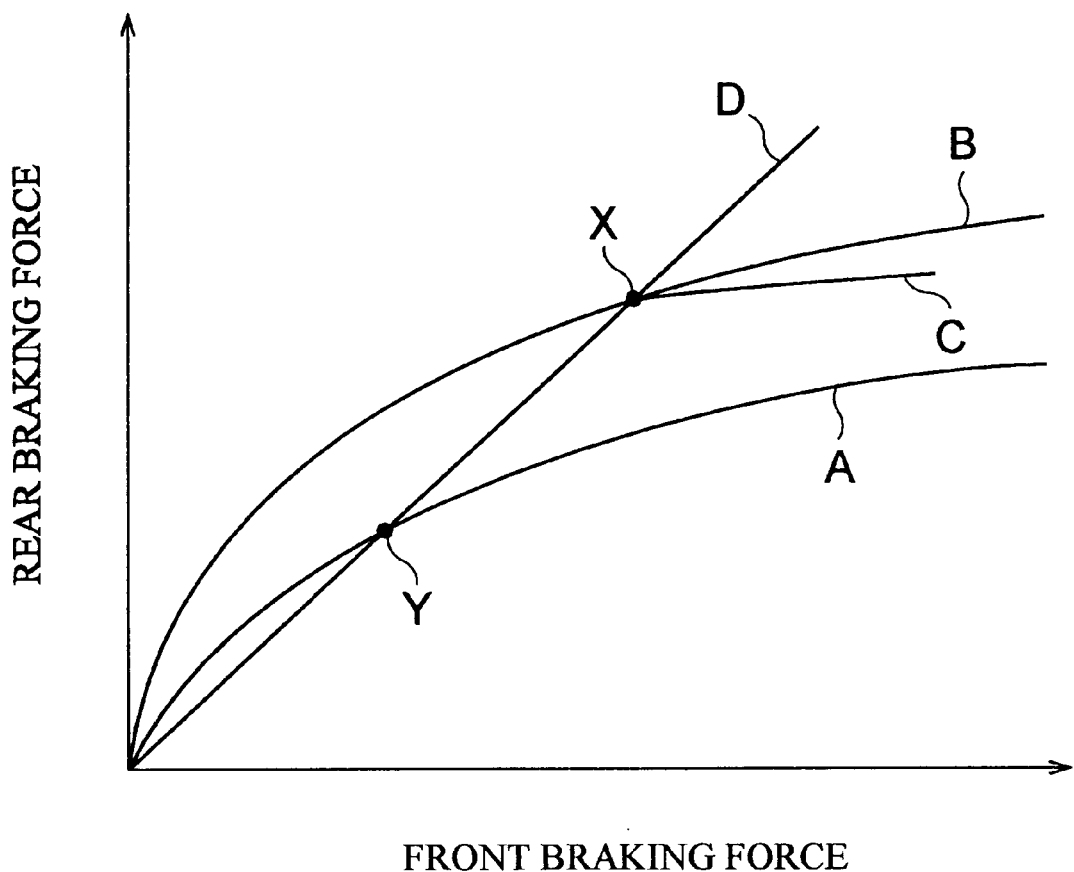
FIG. 1 is a characteristic diagram for explaining the braking force distributions of the front and rear wheels.

In FIG. 1, intersecting point Y between the ideal braking force distribution line in the empty car state (curve A) and the basic distribution line (straight line D) and intersecting point X between the ideal braking force distribution line in the normal loaded car state (curve B) and the basic distribution line (straight line D) are front and rear braking force distribution points where the four wheels are locked simultaneously in that car. The body deceleration occurring in the car in the state wherein the braking force distribution is that at the intersecting point Y in the empty car state (corresponding to the estimated body deceleration $DV_{SOF}$ in the embodiments) is smaller than the body deceleration occurring in the car in the state wherein the braking force distribution is that at the intersecting point X in the loaded car state.

Accordingly, by setting K1 in Eq. (1) to a body deceleration value occurring in the car in the state wherein the braking force distribution is one near the intersecting point Y in the empty car state and by setting K2 in Eq. (6) to a body deceleration value occurring in the car in the state wherein the braking force distribution is one near the intersecting point X in the loaded car state, proper braking force distributions can be obtained both in the empty car state and in the loaded car state.

As described above, since the braking force distribution controlling apparatus of the present invention is arranged so that one of the initiation conditions is to satisfy either one of such a first condition that the body deceleration is not less than the first predetermined deceleration and that the rear-wheel slip value is greater than the front-wheel slip value by at least the first predetermined value and such a second condition that the body deceleration is not less than the second predetermined deceleration K2 which is the value greater than the first predetermined deceleration K1, the braking force distribution control of the front and rear wheels is initiated irrespective of the difference between the front-wheel slip amount and the rear-wheel slip amount when the body deceleration becomes the second predetermined deceleration K2 or more. Therefore, when the normal tires are mounted, the braking force distribution control is initiated by the first condition; thus the braking force distribution control is initiated even when the detected value of the difference between the front and rear slip values is inaccurate and smaller than the first predetermined value though the actual difference between front and rear slip values is greater than the first predetermined value necessitating the braking force distribution control, for example, when the irregular size tires are mounted. This permits the braking force distribution control close to the ideal braking force distributions to be performed even when the irregular size tires are mounted.

When the condition that "the rear-wheel slip value is greater than the front-wheel slip value by at least the second predetermined value which is smaller than the first predetermined value" is added to the second condition, the braking force distribution control can be prevented from being initiated when the front-wheel slip value is greater than the rear-wheel slip value. This can prevent erroneous activation of the braking force distribution control when the front-wheel slip amount becomes rather greater than the rear-wheel slip amount during braking on road surfaces exhibiting a great velocity drop of the four wheels during braking, such as low-$\mu$ roads. From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 237850/1996 filed on Sep. 9, 1996 is hereby incorporated by reference.

What is claimed is:

1. A braking force distribution controlling apparatus mounted on a car and arranged to perform such a control as to make a rear-wheel braking force smaller than a front-wheel braking force when predetermined initiation conditions are met, wherein one of said initiation conditions is to satisfy either one of such a first condition that a body deceleration is not less than a first predetermined deceleration K1 and that a rear-wheel slip value is greater than a front-wheel slip value by at least a first predetermined value and such a second condition that said body deceleration is not less than a second predetermined deceleration K2, which is a value greater than said first predetermined deceleration K1.

2. A braking force distribution controlling apparatus according to claim 1, wherein determination of whether said rear-wheel slip value is greater than said front-wheel slip value by at least the first predetermined value is made by determining whether a value obtained by subtracting a wheel velocity of rear wheel from a wheel velocity of front wheel is not less than the first predetermined value.

3. A braking force distribution controlling apparatus mounted on a car and arranged to perform such a control as to make a rear-wheel braking force smaller than a front-wheel braking force when predetermined initiation conditions are met, said controlling apparatus having body velocity calculating means for calculating a deceleration of the body, based on velocities of wheels, wherein one of said initiation conditions is to satisfy either one of such a first condition that a body deceleration is not less than a first predetermined deceleration K1 and that a rear-wheel slip value is greater than a front-wheel slip value by at least a first predetermined value and such a second condition that said body deceleration is not less than a second predetermined deceleration K2, which is a value greater than said first predetermined deceleration K1, and that the rear-wheel slip value is greater than the front-wheel slip value by at least a second predetermined value which is smaller than the first predetermined value.

4. A braking force distribution controlling apparatus according to claim 3, wherein determination of whether said rear-wheel slip value is greater than said front-wheel slip value by at least the first or second predetermined value is made by determining whether a value obtained by subtracting a wheel velocity of rear wheel from a wheel velocity of front wheel is not less than the first or second predetermined value.

* * * * *